US012718991B2

(12) United States Patent
Kauh

(10) Patent No.: US 12,718,991 B2
(45) Date of Patent: Aug. 25, 2026

(54) STABILIZER

(71) Applicant: Ye Woon Kauh, Seoul (KR)

(72) Inventor: Ye Woon Kauh, Seoul (KR)

( * ) Notice: Subject to any disclaimer, the term of this patent is extended or adjusted under 35 U.S.C. 154(b) by 307 days.

(21) Appl. No.: 18/700,940

(22) PCT Filed: Oct. 11, 2022

(86) PCT No.: PCT/KR2022/015303

§ 371 (c)(1),
(2) Date: Apr. 12, 2024

(87) PCT Pub. No.: WO2023/063684

PCT Pub. Date: Apr. 20, 2023

(65) Prior Publication Data

US 2025/0239420 A1 Jul. 24, 2025

(30) Foreign Application Priority Data

Oct. 12, 2021 (KR) ........................ 10-2021-0135238

(51) Int. Cl.
*H01H 3/12* (2006.01)
*H01H 13/705* (2006.01)

(52) U.S. Cl.
CPC .......... *H01H 3/122* (2013.01); *H01H 13/705* (2013.01)

(58) Field of Classification Search
CPC ...... H01H 3/125; H01H 13/705; H01H 13/14; H01H 13/04; H01H 13/10; H01H 13/70;
(Continued)

(56) References Cited

U.S. PATENT DOCUMENTS

2018/0197699 A1* 7/2018 Shen .................. H01H 13/7057

FOREIGN PATENT DOCUMENTS

JP 3067387 3/2000
JP 2003-186600 7/2003
(Continued)

OTHER PUBLICATIONS

International Search Report issued Feb. 8, 2023 in International (PCT) Application No. PCT/KR2022/015303.

*Primary Examiner* — Ahmed M Saeed
(74) *Attorney, Agent, or Firm* — Wenderoth, Lind & Ponack, L.L.P.

(57) ABSTRACT

Disclosed is a stabilizer. An embodiment of the present disclosure provides a stabilizer including a connection rod including a connection rod body extending in one direction, and connection rod arms extending from the connection rod body in a direction different from one direction, one or more core columns having internal structures into which the connection rod arms are inserted, the core column being configured to be movable in an upward/downward direction by an external force, and one or more housings having a housing fixing portion in which the connection rod body is disposed, and having a housing space into which the core column is inserted, in which the connection rod arms are rotated about the connection rod body, as a rotation axis, by a movement of the core column in the upward/downward direction, and in which the internal structure has a structure in which the connection rod arms are rotatable to a height lower than the connection rod body.

4 Claims, 12 Drawing Sheets

(58) Field of Classification Search
CPC ............. H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

FOREIGN PATENT DOCUMENTS

| | | |
|---|---|---|
| JP | 2015-11700 | 1/2015 |
| JP | 2016-162670 | 9/2016 |
| JP | 2018-120843 | 8/2018 |

* cited by examiner

[FIG. 1B]
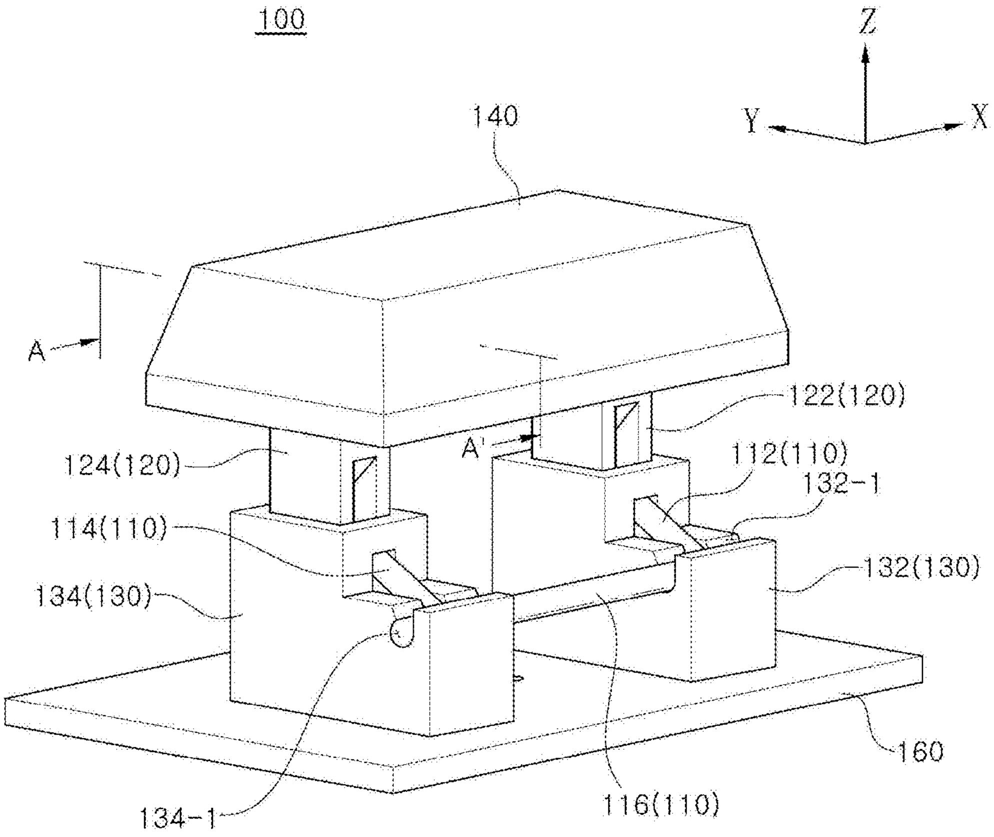

[FIG. 1C]
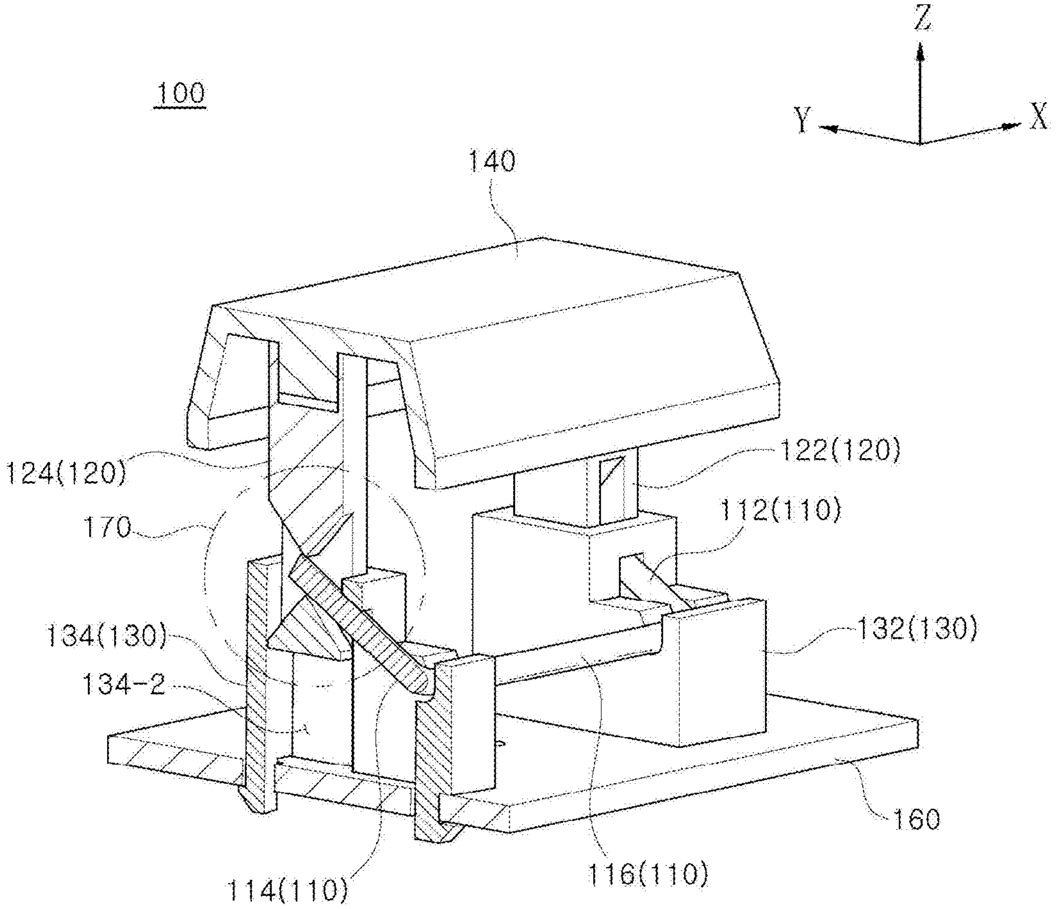

[FIG. 2A]
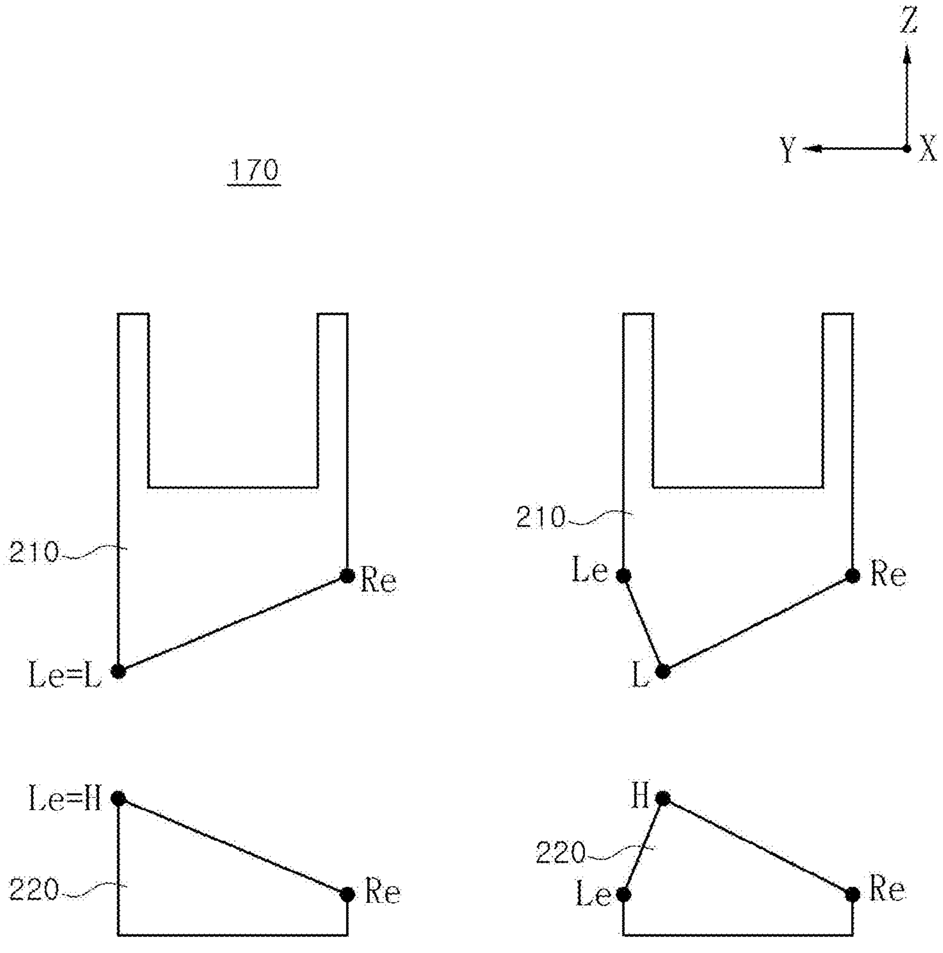
(a) (b)

[FIG. 2B]
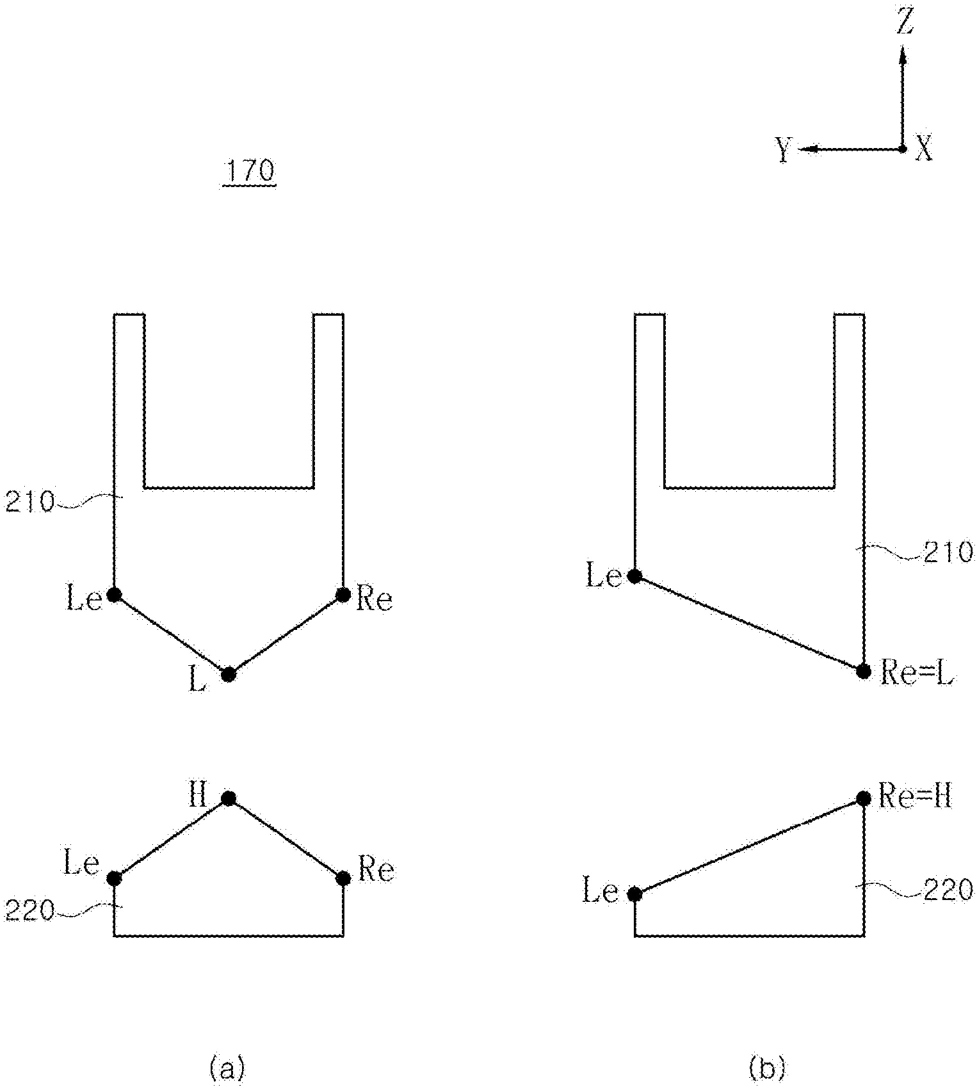

[FIG. 3A]
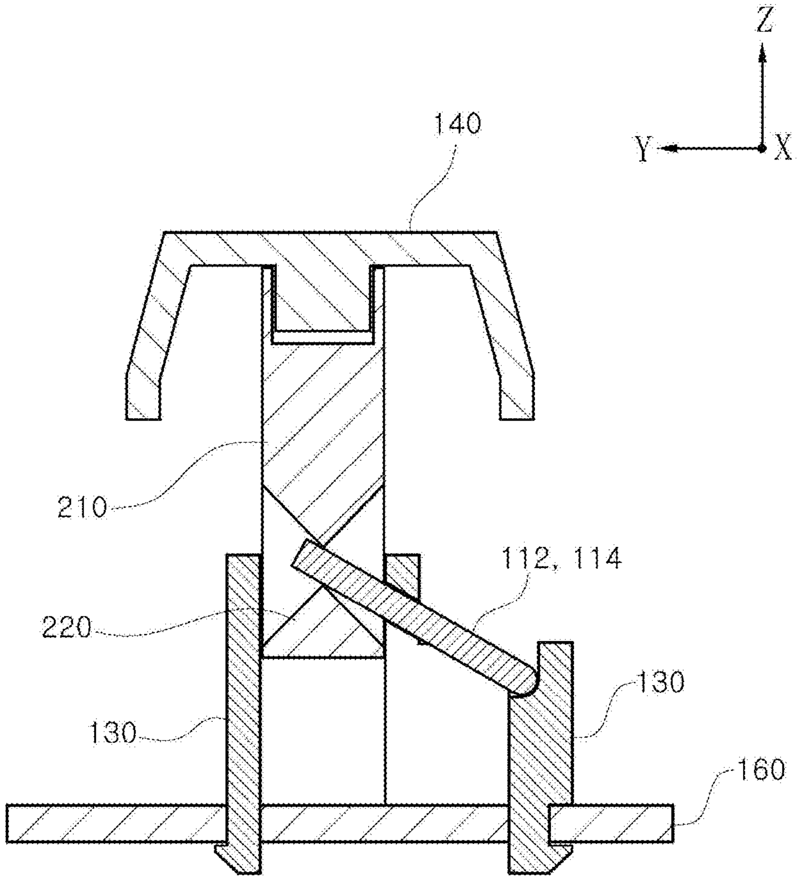

[FIG. 3B]
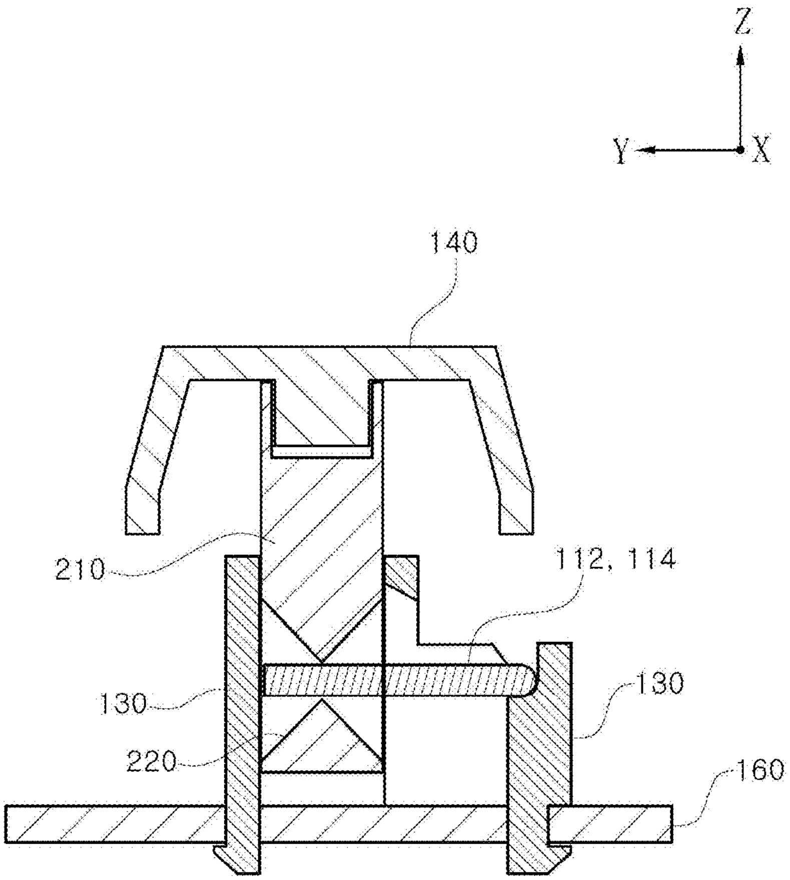

[FIG. 3C]
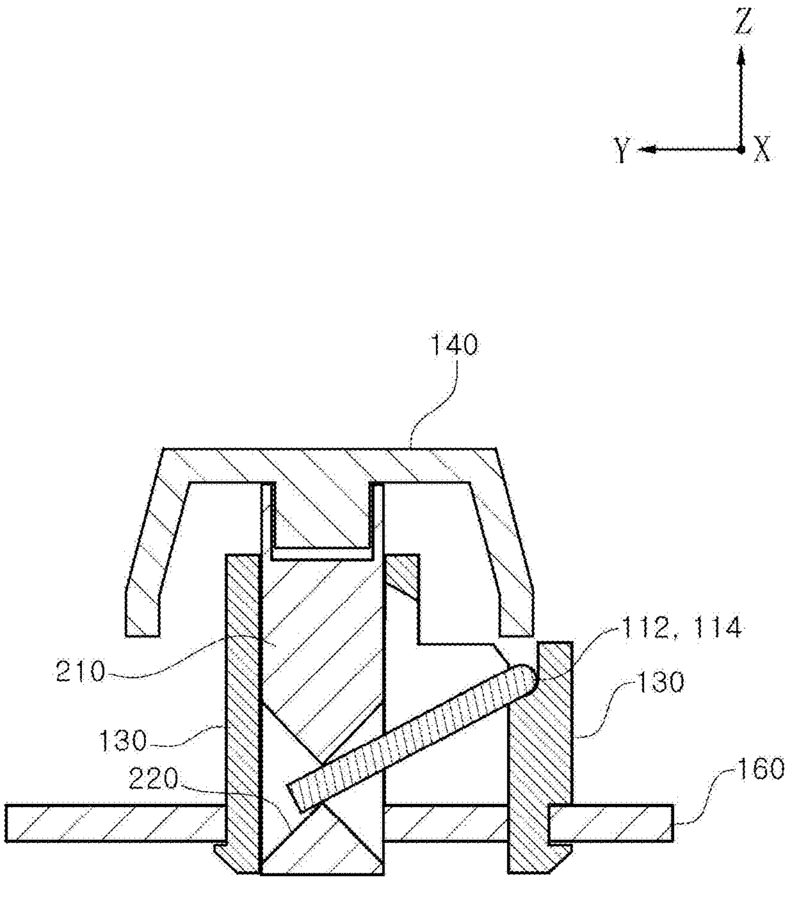

[FIG. 4]
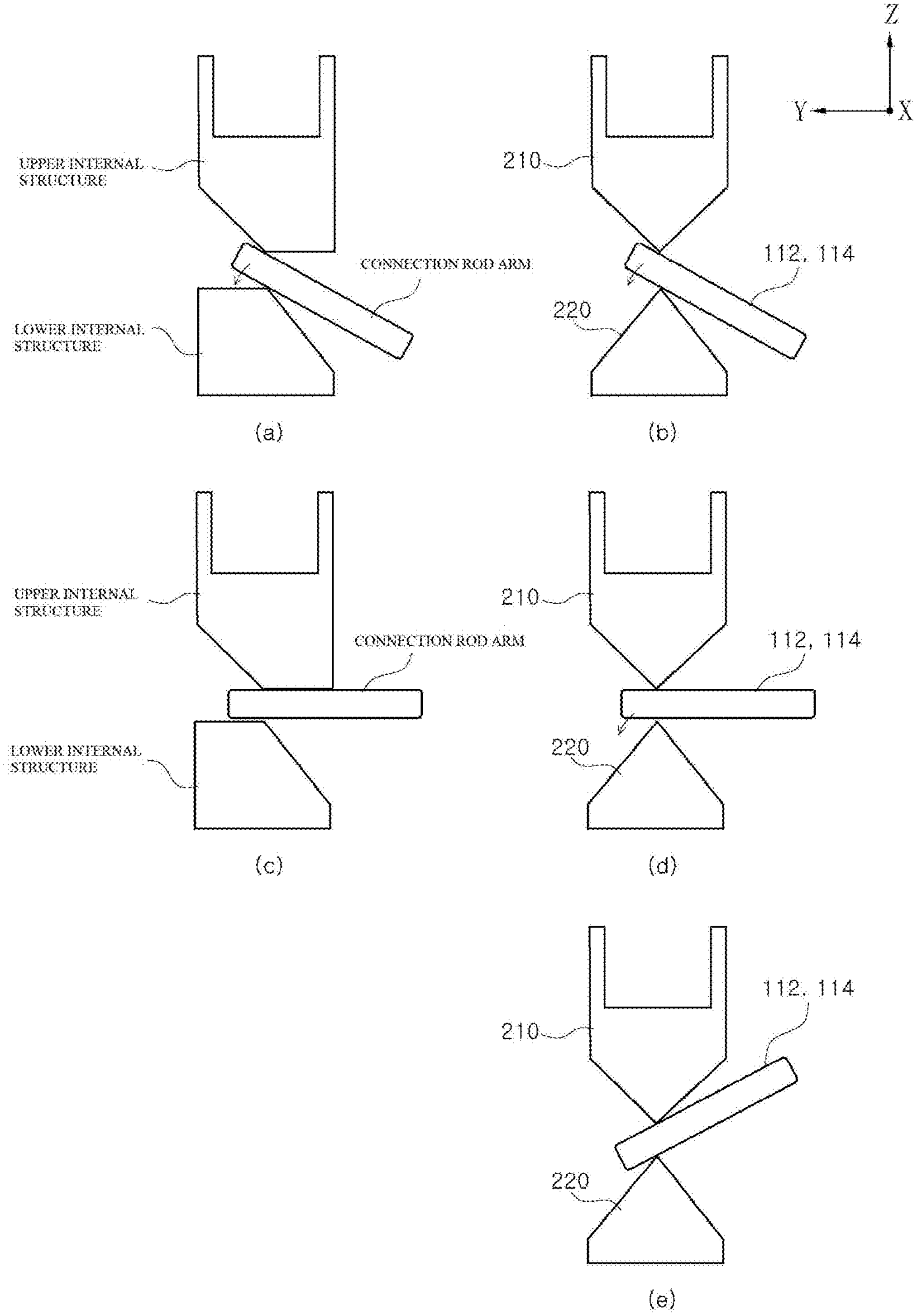

[FIG. 5A]
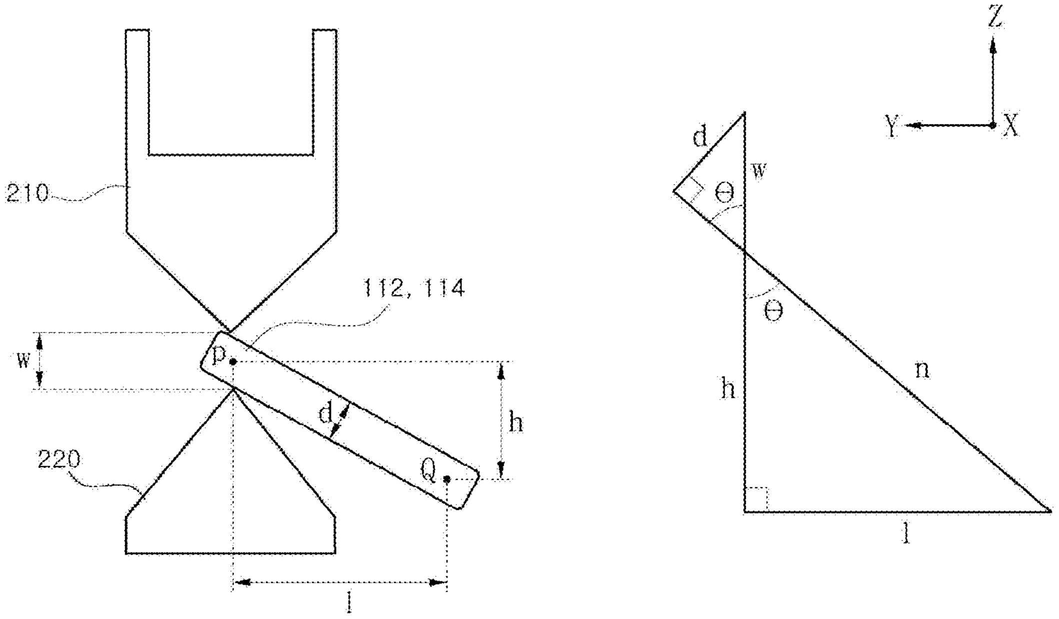

[FIG. 5B]
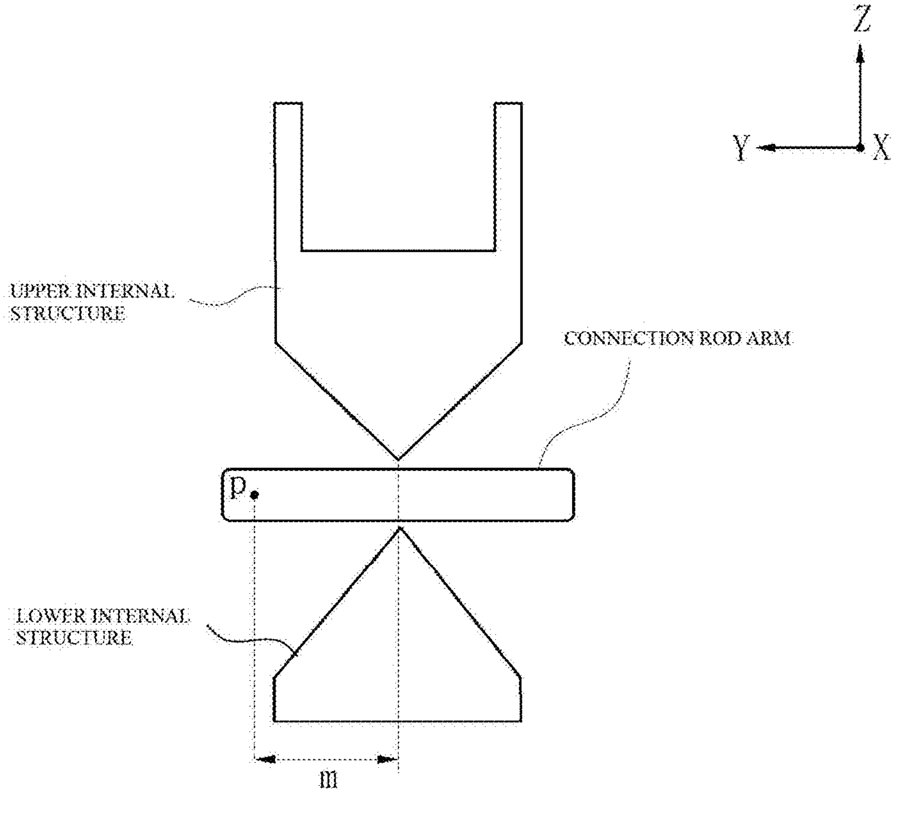

STABILIZER

TECHNICAL FIELD

This application claims priority to and the benefit of Korean Patent Application No. 10-2021-0135238 filed with the Korean Intellectual Property Office on Oct. 12, 2021, the entire contents of which are incorporated herein by reference.

The present disclosure relates to a stabilizer, and more particularly, to a stabilizer capable of improving a leveling function and reducing frictional resistance by changing a rotation angle of a connection rod.

BACKGROUND ART

A stabilizer serves to level a switch having a relatively wide keycap, such as a space key and a enter key of a keyboard.

For example, when an external force is applied to a right portion of a wide keycap by a user, a left portion of the switch is also moved downward together with the right portion of the switch by a structural feature of the stabilizer. Even when an external force is applied to the left portion of the wide keycap by the user, the right portion of the switch is also moved downward together with the left portion of the switch by the structural feature of the stabilizer.

However, the particular portion of the keycap, to which the external force is applied by the user, and the other portions, to which no external force is applied by the user, cannot maintain ideally the same height while the keycap moves downward.

That is, the particular portion, to which the external force is applied by the user, is positioned to be lower in height than the other portions, to which no external force is applied by the user, while the keycap moves downward. For this reason, the keycap moves downward in a state in which the keycap is inclined at a slight angle.

Because of structural characteristics and tolerance of the switch or the stabilizer, the keycap is inclined while moving downward. In addition, it is possible to minimize the inclination of the keycap caused by tolerance by implementing a precise process of manufacturing the switch or the stabilizer. However, the inclination of the keycap caused by the structural characteristics of the switch or the stabilizer still remains.

There is a need for a new solution capable of removing or minimizing the inclination of the keycap caused by structural characteristics of the stabilizer by taking in consideration that the basic function of the stabilizer is to level the switch.

DISCLOSURE

Technical Problem

In order to solve the above-mentioned problem, an object of the embodiment of the present disclosure is to provide a stabilizer capable of improving a leveling function and reducing frictional resistance by changing a rotation angle of a connection rod.

Technical Solution

An embodiment of the present disclosure provides a stabilizer including a connection rod including a connection rod body extending in one direction, and connection rod arms extending from the connection rod body in a direction different from one direction, one or more core columns having internal structures into which the connection rod arms are inserted, the core column being configured to be movable in an upward/downward direction by an external force, and one or more housings having a housing fixing portion in which the connection rod body is disposed, and having a housing space into which the core column is inserted, in which the connection rod arms are rotated about the connection rod body, as a rotation axis, by a movement of the core column in the upward/downward direction, and in which the internal structure has a structure in which the connection rod arms are rotatable to a height lower than the connection rod body.

Advantageous Effects

According to the embodiment of the present disclosure, the inclination of the keycap caused by the structural characteristics of the stabilizer may be removed or minimized by changing the structure of the stabilizer.

In addition, according to the embodiment of the present disclosure, it is possible to reduce frictional resistance of the stabilizer caused while the keycap moves in the upward/downward direction.

The effects obtained by the present disclosure are not limited to the aforementioned effects, and other effects, which are not mentioned above, will be clearly understood by those skilled in the art from the following description.

DESCRIPTION OF DRAWINGS

FIG. 1B is a coupled view of the stabilizer according to the embodiment of the present disclosure.

FIG. 1C is a cross-sectional view of the stabilizer according to the embodiment of the present disclosure.

FIGS. 2A and 2B are exemplified views for explaining various examples of an internal structure according to the embodiment of the present disclosure.

FIGS. 3A, 3B, and 3C are exemplified views for explaining operations of the stabilizer according to the embodiment of the present disclosure.

FIG. 4 is an exemplified view for explaining a comparison between the stabilizer according to the embodiment of the present disclosure and a stabilizer in the related art.

FIGS. 5A and 5B are exemplified views for explaining a technical feature of the stabilizer according to the embodiment of the present disclosure.

EXPLANATION OF REFERENCE NUMERALS AND SYMBOLS

Figure 1A:
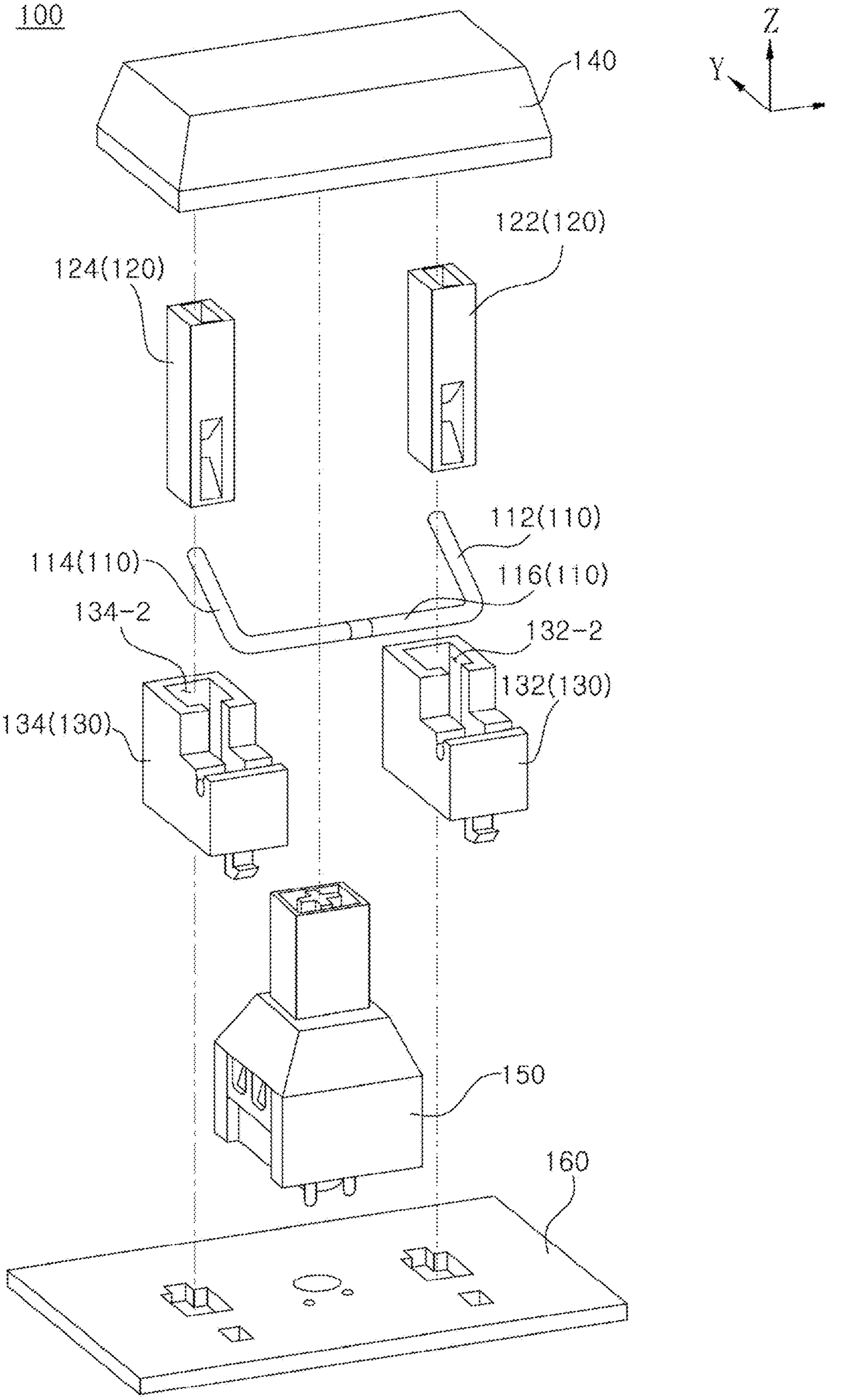
FIG. 1A is an exploded perspective view of a stabilizer according to an embodiment of the present disclosure.

100: Stabilizer
110: Connection rod
112: Right connection rod arm
114: Left connection rod arm
116: Connection rod body
120: Core column
122: Right core column
124: Left core column
130: Housing
132: Right housing
134: Left housing

132-1, 134-1: Housing fixing portion
132-2, 134-2: Housing space
140: Keycap 142-1: Right key connection rod
144-1: Left key connection rod
142-2, 144-2: Internal space
150: Keyboard switch
160: PCB
170: Internal structure
210: Upper internal structure
220: Lower internal structure

BEST MODE

Hereinafter, exemplary embodiments of the present disclosure will be described in detail with reference to the accompanying drawings so that those with ordinary skill in the art to which the present disclosure pertains may easily carry out the exemplary embodiments. However, the present disclosure may be implemented in various different ways and is not limited to the embodiments described herein. Further, a part irrelevant to the description will be omitted in the drawings in order to clearly describe the present disclosure, and similar constituent elements will be designated by similar reference numerals throughout the specification.

The terms used in the present disclosure are general terms currently widely used in the art in consideration of functions in the present disclosure, but the terms may vary according to the intention of those skilled in the art, precedents, or new technology in the art. Further, specified terms are selected arbitrarily by the applicant, and in this case, the detailed meaning thereof will be described in the detailed description of the disclosure. Thus, the terms used in the present disclosure should be defined based not on simple names but on the meaning of the terms and the overall description of the present disclosure.

Throughout the specification, unless explicitly described to the contrary, the word "comprise/include" and variations such as "comprises/includes" or "comprising/including" will be understood to imply the further inclusion of stated elements but not the exclusion of any other elements. In addition, the term "unit", "part", "module", or the like, which is described in the specification, means a unit that performs at least one function or operation, and the "unit", "part", or the like may be implemented by hardware, software, or a combination of hardware and software. In addition, throughout this specification and the claims, when one constituent element is referred to as being "connected to" another constituent element, one constituent element can be "directly connected to" the other constituent element, and one constituent element can also be "connected to" the other element with another element therebetween.

FIG. 1A is an exploded perspective view of a stabilizer 100 according to an embodiment of the present disclosure, FIG. 1B is a coupled view of the stabilizer 100, and FIG. 1C is a cross-sectional view of the stabilizer 100 taken along line A-A' in FIG. 1B.

As illustrated in FIGS. 1A, 1B, and 1C, the stabilizer 100 may include a connection rod 110, one or more core columns 120, and one or more housings 130. In addition, the stabilizer 100 may constitute a keyboard switch by being coupled to a keycap 140, a switch 150, and a printed circuit board (PCB) 160.

The connection rod 110 may include a connection rod body 116 and connection rod arms 112 and 114.

The connection rod body 116 may extend in one direction, and the connection rod arms 112 and 114 may extend from the connection rod body 116. The connection rod arms 112 and 114 may extend in a direction different from one direction in which the connection rod body 116 extends.

Based on FIGS. 1A, 1B, and 1C, the connection rod arms 112 and 114 may include a right connection rod arm 112 provided at the right side, and a left connection rod arm 114 provided at the left side.

The connection rod arms 112 and 114 may be rotated about the connection rod body 116, as a rotation axis, by an upward movement of the core column 120.

The core column 120 is configured to be moved in an upward/downward direction by an external force applied to the keycap 140 by a user. For example, the core column 120 moves downward when an external force is applied to the keycap 140 by the user. When the external force applied by the user is eliminated, the core column 120 is moved upward by a restoring force of the switch 150.

Meanwhile, directions described in the present specification will be defined, as follows.

The upward/downward direction means a direction parallel to a z-axis illustrated in the drawings. Therefore, the upward or up direction corresponds to a direction toward the z-axis, and the downward or down direction corresponds to a direction toward the −z-axis. A vertical direction means a direction parallel to a y-axis illustrated in the drawings, and a horizontal direction means a direction parallel to an x-axis illustrated in the drawings.

The core columns 120 have internal structures 170 into which the connection rod arms 112 and 114 are inserted. The internal structure into which the right connection rod arm 112 is inserted is formed in the right core column 122, and the internal structure into which the left connection rod arm 114 is inserted is formed in the left core column 124.

The internal structures 170 of the core columns 120 have structures that allow the connection rod arms 112 and 114 to rotate at a height lower than the connection rod body 116 corresponding to the rotation axis. A specific description of the internal structure 170 will be described below.

FIGS. 1A, 1B, and 1C illustrate an example in which the core columns 120 include two core columns 122 and 124 that are physically distinguished. However, according to the embodiment, the core column 120 may be physically implemented as a single core column 120.

The housings 130 are configured to fix or arrange the connection rod 110 and the core columns 130.

The housings 130 have housing spaces 132-2 and 134-2. The core columns 120 are inserted into the housing spaces 132-2 and 134-2, such that the positions of the core columns 120 may be stably fixed. The housing spaces 132-2 and 134-2 may include a right housing space 132-2 into which the right core column 122 is inserted, and a left housing space 134-2 into which the left core column 124 is inserted.

The housings 130 have housing fixing portions 132-1 and 134-1. The connection rod body 116 is disposed in the housing fixing portions 132-1 and 134-1, such that the position of the connection rod 110 may be stably fixed.

The housing 130 is coupled to the PCB 160, such that the position of the housing 130 may be stably fixed. The housing 130 may be physically implemented as a single component. As illustrated in FIGS. 1A, 1B, and 1C, the housings 130 may be implemented as physically separated two components 132 and 134.

Hereinafter, a structural feature of the internal structure 170 will be described. To summarize the structural feature of the internal structure 170, the structural feature of the internal structure 170 is that the connection rod arms 112 and 114 may rotate at a height lower than the connection rod body 116. FIGS. 2A and 2B illustrate various examples for explaining the structural feature of the internal structure 170.

As illustrated in FIGS. 2A and 2B, the internal structure 170 may include an upper internal structure 210 positioned (formed) at an upper side, and a lower internal structure 220 positioned (formed) at a lower side. The connection rod arm 112 or 114 may be inserted into an internal space formed between the upper internal structure 210 and the lower internal structure 220.

As illustrated in (a) and (b) in FIG. 2A and (a) in FIG. 2B, the upper internal structure 210 may have an inclined structure at the lower side, and the lower internal structure 220 may have an inclined structure at the upper side.

For example, the upper internal structure 210 may have the inclined structure in which a height of a point Re positioned at a right end (right edge) based on a vertical direction is higher than a height of a lowest point (a point L at a lowest height) of the upper internal structure 210. The lower internal structure 220 may have the inclined structure in which a height of a point Le positioned at a left end (left edge) based on the vertical direction is higher than a highest point (a point H at a highest height) of the lower internal structure 220.

In addition, based on the vertical direction, the lowest point L of the upper internal structure 210 may be positioned at a position different from the highest point H of the lower internal structure 220. Alternatively, the lowest point L and the highest point H may be positioned at the same position, as illustrated in (a) and (b) in FIG. 2A and (a) in FIG. 2B.

Further, as illustrated in (a) in FIG. 2B, the lowest point L of the upper internal structure 210 may be positioned at a center of the upper internal structure 210 based on the vertical direction, and the highest point H of the lower internal structure 220 may also be positioned at a center of the lower internal structure 220 based on the vertical direction.

To summarize the inclined structure illustrated in (a) and (b) in FIG. 2A and (a) in FIG. 2B, the upper internal structure 210 may include the entirety or a part of the inclined structure inclined rightward and upward (leftward and downward), and the lower internal structure 220 may include the entirety or a part of the inclined structure inclined rearward and downward (leftward and upward).

As another embodiment, as illustrated in (b) in FIG. 2B, the upper internal structure 210 may have the inclined structure in which the lowest point L is positioned at a right end Re based on the vertical direction, and the lower internal structure 220 may have the inclined structure in which the highest point H is positioned at the right end Re based on the vertical direction.

To summarize the inclined structure illustrated in (b) in FIG. 2B, the upper internal structure 210 may include the entirety of the inclined structure inclined rightward and downward (leftward and upward), and the lower internal structure 220 may include the entirety of the inclined structure inclined rightward and upward (leftward and downward).

Hereinafter, an operation of the stabilizer 100 of the present disclosure will be described based on the structural characteristics of the internal structure 170. FIGS. 3A, 3B, and 3C are exemplified views for explaining an operation of the stabilizer 100.

FIG. 3A illustrates a basic state in which no external force is applied to the keycap 140 by the user. In this case, the core column 120 and the upper and lower internal structures 210 and 220, which are included in the core column 120, have the highest height, and the connection rod arms 112 and 114 also have the highest height in the state in which the connection rod arms 112 and 114 are not rotated.

FIG. 3B illustrates a case in which an external force is applied to the keycap 140 by the user and the connection rod arms 112 and 114 rotate to be in a state (horizontal state) parallel to the vertical direction.

When an external force is applied to the keycap 140 by the user, the core column 120 moves downward, and the connection rod arms 112 and 114 are rotated counterclockwise by the contact with the upper internal structure 210.

Specifically, in case that an external force is applied to the left side of the keycap 140 by the user, the left core column 124 moves downward, and the left connection rod arm 114 is rotated counterclockwise by the contact with the upper internal structure 210. Because the right connection rod arm 112 is connected to the left connection rod arm 114 through the connection rod body 116, the right connection rod arm 112 also rotates counterclockwise, and the lower internal structure 220 is moved downward by the contact with the right connection rod arm 112. As a result, the rear side of the keycap 140 also moves downward.

In case that an external force is applied to the right side of the keycap 140 by the user, the right core column 122 moves downward, and the right connection rod arm 112 is rotated counterclockwise by the contact with the upper internal structure 210. Because the left connection rod arm 114 is connected to the right connection rod arm 112 through the connection rod body 116, the left connection rod arm 114 also rotates counterclockwise, and the lower internal structure 220 is moved downward by the contact with the left connection rod arm 114. As a result, the left side of the keycap 140 also moves downward.

FIG. 3C illustrates a case in which an external force is consistently applied to the keycap 140 by the user and the connection rod arms 112 and 114 rotate and move to a height lower than the connection rod body 116 corresponding to the rotation axis.

The upper internal structure 210 has the inclined structure in which the lowest point is positioned between the right end and the left end, and the lower internal structure 220 has the inclined structure in which the highest point is positioned between the right end and the left end. Therefore, the internal structure 170 has spaces, in which the connection rod arm 112 or 114 may rotate, at the left and right sides based on the lowest point of the upper internal structure 210 or the highest point of the lower internal structure 220.

Therefore, in case that an external force is consistently applied to the keycap 140 by the user, the connection rod arm 112 or 114 may rotate and move to a height lower than the connection rod body 116.

Hereinafter, a comparison between an operation of the stabilizer 100 according to the present disclosure and an operation of a stabilizer in the related art will be described. FIG. 4 is an exemplified view illustrating a comparison between the internal structure 170 of the stabilizer 100 according to the present disclosure and an internal structure of a stabilizer in the related art.

FIG. 4A illustrates the internal structure of the stabilizer in the related art in a state in which no external force is applied by the user, and FIG. 4B illustrates the internal structure 170 of the stabilizer 100 according to the present disclosure in a state in which no external force is applied by the user.

When no external force is applied by the user, the upper internal structure 210 and the lower internal structure 220 of the stabilizer 100 according to the present disclosure have the highest heights, and the connection rod arms 112 and 114 also have the highest height in the state in which the connection rod arms 112 and 114 are not rotated. In addition, the upper internal structure and the lower internal structure of the stabilizer in the related art also have the highest height, and the connection rod arm also has the highest height in a state in which the connection rod arm is not rotated.

FIG. 4C illustrates the stabilizer in the related art in which the connection rod arm is rotated in a direction parallel to the vertical direction by an external force applied by the user, and FIG. 4D illustrates the stabilizer 100 according to the present disclosure in which the connection rod arms 112 and 114 are rotated in a direction parallel to the vertical direction by an external force applied by the user.

In the case of the stabilizer in the related art, the connection rod arm cannot additionally rotate because of the contact with the lower internal structure even though the external force is consistently applied by the user in the state in FIG. 4C. That is, the connection rod arm of the stabilizer in the related art may rotate only to the horizontal state.

However, as illustrated in FIG. 4E, because the stabilizer 100 according to the present disclosure has the inclined structure in which the upper internal structure 210 and the lower internal structure 220 define the extra spaces at the left and right sides based on the upward/downward direction, the connection rod arms 112 and 114 may additionally rotate in case that the external force is consistently applied by the user.

Hereinafter, a technical effect, which may be provided by the stabilizer 100 of the present disclosure by the structural feature of the internal structure 170, will be described with reference to FIGS. 5A and 5B.

FIG. 5A illustrates the internal structure 170 in the basic state in which no external force is applied by the user. In FIG. 5A, w represents a vertical distance (distance based on the upward/downward direction) between the lowest point of the upper internal structure 210 and the highest point of the lower internal structure 220, P represents a center point of the vertical distance, and Q represents a rotation center.

l represents a vertical length between P and Q, n represents a distance between P and Q, and h represents a length in the upward/downward direction between P and Q. Therefore, a relationship is established between l, n, and h based on Equation 1 below.

$$n^2 = h^2 + l^2 \quad \text{[Equation 1]}$$

A vertical triangle defined by l, n, and h and a vertical triangle defined by d and w, which represent thicknesses (diameters) of the connection rod arms 112 and 114, have vertically opposite angles θ. Therefore, Equation 2 below is implemented.

$$\sin\theta = \frac{l}{n} = \frac{d}{w} \quad \text{[Equation 2]}$$

Equation 3 is obtained by solving Equation 2 for w.

$$w = \frac{n}{l} \times d \quad \text{[Equation 3]}$$

Equation 4 is obtained by applying Equation 1 to Equation 3.

$$w = d \times \sqrt[2]{1 + \left(\frac{h}{l}\right)^2} \quad \text{[Equation 4]}$$

Equation 5 is obtained by calculating tolerance g, which is a difference between w and d, by using Equation 4.

$$g = w - d = d \times \left(\sqrt[2]{1 + \left(\frac{h}{l}\right)^2} - 1\right) \quad \text{[Equation 5]}$$

Table 1 below is obtained by calculating w and g by fixing l=10 mm and d=1.6 mm in Equations 4 and 5 and changing a value of h.

TABLE 1

| h(mm) | w(mm) | g(mm) |
|---|---|---|
| 2 | 1.632 | 0.032 |
| 4 | 1.732 | 0.123 |
| 5 | 1.789 | 0.189 |
| 10 | 2.263 | 0.663 |

In case that a motion of 4 mm is implemented in the upward/downward direction, the core column of the stabilizer in the related art moves 0 to 4 mm, whereas the core column 120 of the stabilizer 100 according to the present disclosure moves −2 to +2 mm.

That is, the core column of the stabilizer in the related art moves 0 to 4 mm only at the upper side based on the horizontal direction. However, the core column 120 of the stabilizer 100 according to the present disclosure moves 2 mm at the upper side based on the horizontal direction and moves 2 mm at the lower side based on the horizontal direction.

Therefore, g of the stabilizer in the related art is 0.123 mm, but g of the stabilizer 100 according to the present disclosure is 0.032 mm, and as a result, g of the stabilizer 100 according to the present disclosure is about 3.84 times smaller than that of the stabilizer in the related art.

As another example, in case that a motion of 10 mm is implemented in the upward/downward direction, the core column of the stabilizer in the related art moves 0 to 10 mm, whereas the core column 120 of the stabilizer 100 according to the present disclosure moves −5 to +5 mm.

That is, the core column of the stabilizer in the related art moves 0 to 10 mm only at the upper side based on the horizontal direction. However, the core column 120 of the stabilizer 100 according to the present disclosure moves 5 mm at the upper side based on the horizontal direction and moves 5 mm at the lower side based on the horizontal direction.

Therefore, g of the stabilizer in the related art is 0.663 mm, but g of the stabilizer 100 according to the present disclosure is 0.189 mm, and as a result, g of the stabilizer 100 according to the present disclosure is about 3.508 times smaller than that of the stabilizer in the related art.

Because g corresponds to a distance between w and d, the tolerance increases as g increases, such that the inclination of the keycap 140 increases. Because the stabilizer 100 according to the present disclosure has g that is very smaller than g of the stabilizer in the related art, the inclination of the keycap 140 may be further reduced, and as a result, the natural function of the stabilizer, which is the leveling function, may be further improved.

FIG. 5B illustrates a state in which an external force is applied by the user and the connection rod arms 112 and 114 rotate to be in the horizontal state. The connection rod arms 112 and 114 are in contact with the upper internal structure 210 and slide by a predetermined distance until the state changes from the state in FIG. 5A to the state in FIG. 5B (until the connection rod arm in the basic state rotates and becomes in the horizontal state).

The distance m by which the connection rod arm slides based on Equation 1 is represented by Equation 6 below.

[Equation 6]

$$m = n - l = \sqrt[2]{l^2 + h^2} - l = l \times \sqrt[2]{1 + \left(\frac{h}{l}\right)^2} - l = l \times \left(\sqrt[2]{1 + \left(\frac{h}{l}\right)^2} - 1\right)$$

Table 2 below is obtained by calculating m by fixing l=10 mm and d=1.6 mm in Equation 6 and changing a value of h.

TABLE 2

| h(mm) | m(mm) |
|---|---|
| 2 | 0.198 |
| 4 | 0.770 |
| 5 | 1.180 |
| 10 | 4.142 |

In case that a motion of 4 mm is implemented in the upward/downward direction, the core column of the stabilizer in the related art moves 0 to 4 mm, whereas the core column 120 of the stabilizer 100 according to the present disclosure moves −2 to +2 mm. Therefore, m of the stabilizer in the related art is 0.770 mm, but m of the stabilizer 100 according to the present disclosure is 0.198 mm.

As another example, in case that a motion of 10 mm is implemented in the upward/downward direction, the core column of the stabilizer in the related art moves 0 to 10 mm, whereas the core column 120 of the stabilizer 100 according to the present disclosure moves −5 to +5 mm. Therefore, m of the stabilizer in the related art is 4.142 mm, but m of the stabilizer 100 according to the present disclosure is 1.180 mm.

Large m means that frictional resistance is high when the user presses the keycap 140. Therefore, the stabilizer 100 according to the present disclosure may provide lower frictional resistance.

In addition, as illustrated in FIG. 5B, in the stabilizer in the related art, m=4.142 mm in case that the motion of 10 mm is implemented in the upward/downward direction. Therefore, when the connection rod arm rotates and becomes in the horizontal state, the connection rod arm protrudes to the outside, which causes a risk that the protruding connection rod arm collides with other components in the keyboard switch.

In contrast, in the stabilizer 100 according to the present disclosure, m is small as m=1.180 mm even when the motion of 10 mm is implemented in the upward/downward direction. Therefore, even though the connection rod arm rotates and becomes in the horizontal state, a problem that the connection rod arm protrudes to the outside does not occur.

Figure 6:
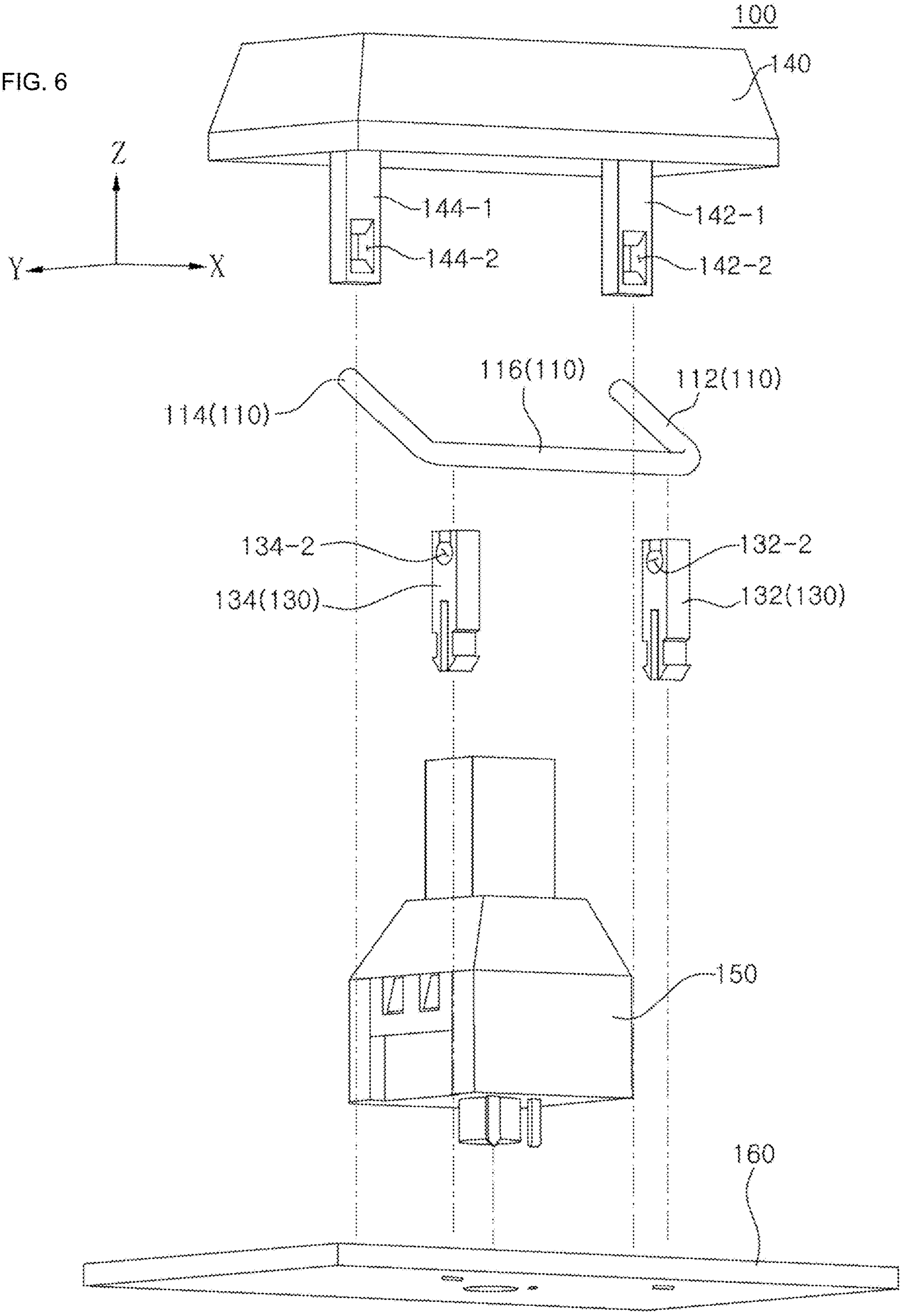
FIG. 6 is an exploded perspective view of a stabilizer according to another embodiment of the present disclosure.

Hereinafter, another embodiment of the stabilizer 100 according to the present disclosure will be described. FIG. 6 is an exploded perspective view illustrating another embodiment of the stabilizer 100.

The components of the stabilizer 100 illustrated in FIG. 6 may correspond in functions, structures, and operations to the components of the stabilizer 100 illustrated in FIGS. 1 to 5.

However, the stabilizer 100 illustrated in FIG. 6 differs from the stabilizer 100 illustrated in FIGS. 1 to 5 in that the stabilizer 100 illustrated in FIG. 6 does not include the component that serves as the core column 120. That is, the stabilizer 100 illustrated in FIG. 6 may include the connection rod 110 and the one or more housings 130.

Because the stabilizer 100 illustrated in FIG. 6 does not include the core column 120 as a separate component, the number of components may be reduced, and the manufacturing process may be simplified and efficient.

The function of the core column 120 of the stabilizer 100 illustrated in FIGS. 1 to 5 may be performed by one or more key connection rods 142-1 and 144-1. The key connection rods 142-1 and 144-1 may be integrated with the keycap 140. The key connection rods 142-1 and 144-1 may be configured as a single key connection rod or a plurality of key connection rods. As illustrated in FIG. 6, the key connection rods 142-1 and 144-1 may include a right key connection rod 142-1 positioned at the right side, and a left key connection rod 144-1 positioned at the left side.

The key connection rods 142-1 and 144-1 may respectively have internal spaces 142-2 and 144-2. The right connection rod arm 112 and the left connection rod arm 114 may be respectively inserted into the internal spaces 142-2 and 144-2. The above-mentioned internal structures 170 may be formed in the internal spaces 142-2 and 144-2. Because of the structural features of the internal structures 170, the connection rod arms 112 and 114 may rotate to a height lower than the connection rod body 116.

It will be appreciated that the embodiments of the present disclosure have been described above for purposes of illustration, and those skilled in the art may understand that the present disclosure may be easily modified in other specific forms without changing the technical spirit or the essential features of the present disclosure. Therefore, it should be understood that the above-described embodiments are illustrative in all aspects and do not limit the present application. For example, each component described as a single type may be carried out in a distributed manner. Likewise, components described as a distributed type can be carried out in a combined type.

The scope of the present disclosure is represented by the claims to be described below rather than the detailed description, and it should be interpreted that the meaning and scope of the claims and all the changes or modified forms derived from the equivalent concepts thereto fall within the scope of the present disclosure.

The invention claimed is:

1. A stabilizer comprising:

a connection rod comprising a connection rod body extending in one direction, and connection rod arms extending from the connection rod body in a direction different from the one direction;

one or more core columns having internal structures into which the connection rod arms are inserted, the core column being configured to be movable in an upward/downward direction by an external force; and one or more housings having a housing fixing portion in which the connection rod body is disposed, and having a housing space into which the core column is inserted, wherein the connection rod arms are rotated about the connection rod body, as a rotation axis, by a movement of the core column in the upward/downward direction, and wherein the internal structure has a structure in which the connection rod arms are rotatable to a height lower than the connection rod body;

wherein the internal structure comprises:

an upper internal structure having an inclined structure in which a height of a point positioned at a right end based on a vertical direction perpendicular to the upward/downward direction is higher than a height of a lowest point; and a lower internal structure having an inclined structure in which a height of a point positioned at a left end based on the vertical direction is higher than a height of a highest point, and wherein the connection rod arms are inserted into internal spaces formed between the upper internal structure and the lower internal structure.

2. The stabilizer of claim 1, wherein the lowest point of the upper internal structure is positioned at the same position as the highest point of the lower internal structure based on the vertical direction.

3. The stabilizer of claim 2, wherein the lowest point of the upper internal structure is positioned at a center of the upper internal structure based on the vertical direction.

4. The stabilizer of claim 1, wherein the internal structure comprises:

the upper internal structure having a lowest point positioned at the right end based on the vertical direction perpendicular to the upward/downward direction; and the lower internal structure having a highest point positioned at the right end.

* * * * *